(12) United States Patent
Hayashida

(10) Patent No.: US 11,134,407 B2
(45) Date of Patent: Sep. 28, 2021

(54) INFORMATION PROCESSING APPARATUS, INFORMATION PROCESSING SYSTEM, AND INFORMATION PROCESSING PROGRAM

(71) Applicant: TOYOTA JIDOSHA KABUSHIKI KAISHA, Toyota (JP)

(72) Inventor: Teruhide Hayashida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/842,905

(22) Filed: Apr. 8, 2020

(65) Prior Publication Data

US 2020/0344634 A1 Oct. 29, 2020

(30) Foreign Application Priority Data

Apr. 24, 2019 (JP) .............................. JP2019-083099

(51) Int. Cl.
| | | |
|---|---|---|
| *H04N 7/18* | (2006.01) | |
| *H04W 28/02* | (2009.01) | |
| *B60R 16/033* | (2006.01) | |
| *H04W 4/44* | (2018.01) | |

(52) U.S. Cl.
CPC ....... *H04W 28/0221* (2013.01); *B60R 16/033* (2013.01); *H04N 7/185* (2013.01); *H04W 4/44* (2018.02)

(58) Field of Classification Search
CPC ......... B60R 25/002; B60R 25/25; B60R 1/00; B60R 1/002; B60R 2300/105; B60R 2300/302; B60R 2300/303; B60R 2300/304; B60R 16/033; B60R 25/102; B60R 25/305; B60R 25/403; G07C 1/32; G07C 2009/00373; G07C 2009/00547; G07C 2009/00769; G07C 2209/04; G07C 9/00309; G07C 9/00563; G07C 2009/00793; H04W 28/0221; H04W 4/44; H04W 4/80; H04N 7/185
USPC ........................................................ 348/148
See application file for complete search history.

(56) References Cited

U.S. PATENT DOCUMENTS

| | | | | |
|---|---|---|---|---|
| 2010/0039494 | A1* | 2/2010 | Horihata | ................... B60R 1/00 348/14.02 |
| 2013/0107054 | A1* | 5/2013 | Ueoka | .............. G08G 1/096775 348/148 |
| 2018/0347532 | A1 | 12/2018 | Tamane et al. | |
| 2019/0066403 | A1* | 2/2019 | Nagura | ................ G08G 1/0112 |
| 2019/0165433 | A1* | 5/2019 | Shiraishi | ................... H02J 7/14 |
| 2020/0195839 | A1* | 6/2020 | Sung | ................ H04N 5/232945 |

FOREIGN PATENT DOCUMENTS

| | | | |
|---|---|---|---|
| JP | 2006-128807 A | 5/2006 | |
| JP | 2018-204472 A | 12/2018 | |

* cited by examiner

*Primary Examiner* — Gims S Philippe
(74) *Attorney, Agent, or Firm* — Oliff PLC

(57) ABSTRACT

A center server is an information processing apparatus communicable with a vehicle including an imaging apparatus and a user terminal of a user of the vehicle. The center server includes a data transmission request unit configured to request the vehicle to transmit imaging data captured by the imaging apparatus when a predetermined request signal is received from the user terminal, and a data transmission unit configured to transmit the imaging data received from the vehicle in response to the request to the user terminal.

3 Claims, 13 Drawing Sheets

FIG. 3

| USER INFORMATION ||||
|---|---|---|---|
| USER | ID | PASSWORD | VEHICLE TYPE OF PRIVATE VEHICLE |
| AAA | abcde | 012a | α |
| BBB | fghij | 34b5a | α |
| CCC | klmnop | 678cde | β |
| DDD | qrstuv | 9012zz | NONE |
| ... | ... | ... | ... |

| RESERVATION INFORMATION FOR VEHICLE A (VEHICLE TYPE α) | | | | | ~132 |
|---|---|---|---|---|---|
| RENTAL DATE AND TIME | RENTAL PLACE | RETURN DATE AND TIME | RETURN PLACE | USER | |
| 8. 1. 2010 12:00 | A SERVICE OFFICE | 8. 1. 2010 18:00 | B SERVICE OFFICE | AAA | |
| 8. 2. 2010 10:00 | B SERVICE OFFICE | 8. 3. 2010 15:00 | C SERVICE OFFICE | BBB | |
| 8. 3. 2010 18:00 | C SERVICE OFFICE | 8. 4. 2010 12:00 | A SERVICE OFFICE | CCC | |
| 8. 4. 2010 15:00 | A SERVICE OFFICE | 8. 4. 2010 21:00 | A SERVICE OFFICE | DDD | |
| ... | ... | ... | ... | ... | |

FIG. 5

| USE HISTORY INFORMATION OF USER AAA ||| ~133 |
| VEHICLE TYPE | START DATE AND TIME | END DATE AND TIME |
| γ | 4.1.2010 12:00 | 4.1.2010 18:00 |
| β | 5.5.2010 10:00 | 5.5.2010 15:00 |
| β | 6.3.2010 18:00 | 6.4.2010 12:00 |
| γ | 7.8.2010 15:00 | 7.8.2010 21:00 |
| ... | ... | ... |

INFORMATION PROCESSING APPARATUS, INFORMATION PROCESSING SYSTEM, AND INFORMATION PROCESSING PROGRAM

INCORPORATION BY REFERENCE

The disclosure of Japanese Patent Application No. 2019-083099 filed on Apr. 24, 2019 including the specification, drawings and abstract is incorporated herein by reference in its entirety.

BACKGROUND

1. Technical Field

The disclosure relates to an information processing apparatus, an information processing system, and an information processing program.

2. Description of Related Art

Japanese Unexamined Patent Application Publication No. 2006-128807 (JP 2006-128807 A) discloses, for example, a technique in which vehicle information (for example, information related to forgetting to lock a vehicle door) is uploaded from a vehicle to a center or the like while ignition of the vehicle is turned off and the uploaded vehicle information can be checked by a user terminal such as a smartphone.

SUMMARY

However, in the related art disclosed in JP 2006-128807 A, for example, imaging data for a user to check a situation of the vehicle or a situation around the vehicle may be uploaded to the center as the vehicle information. Examples of the imaging data include data representing an in-vehicle situation captured by an in-vehicle camera, data representing the situation around the vehicle captured by a camera outside vehicle. Since such imaging data has a large data capacity, an amount of data communication when the imaging data as the vehicle information is uploaded from the vehicle to the center or the like is relatively increased. Therefore, there is a concern about an increase in communication cost or an influence on communication traffic.

The disclosure is to suppress an increase in a communication amount of data to be uploaded from a vehicle.

A first aspect of the disclosure relates to an information processing apparatus communicable with a vehicle including an imaging apparatus and a user terminal of a user of the vehicle. The information processing apparatus includes a data transmission request unit configured to request the vehicle to transmit imaging data captured by the imaging apparatus when a predetermined request signal is received from the user terminal, and a data transmission unit configured to transmit the imaging data received from the vehicle in response to the request to the user terminal.

According to the embodiment, solely when a center server which is the information processing apparatus receives the predetermined request signal indicating a transmission request for the imaging data, imaging data inside and outside the vehicle is uploaded to the center server. Therefore, when the user desires to check a vehicle state (such as door lock state, hazard lamp state, or the like), the center server does not receive the predetermined request signal. Therefore, it is possible to suppress that imaging data having a large data capacity is uploaded to the center server. For this reason, it is possible for the user to check specific vehicle information such as a door lock state while an increase in a communication amount, requested for the uploading, between the in-vehicle device and the center server is suppressed. In addition, it is possible to effectively utilize communication resources by suppressing an increase in a communication amount between the in-vehicle device and the center server.

A second aspect of the disclosure relates to an information processing system. The information processing system includes the information processing apparatus, and a current shutdown unit which is provided in the vehicle and configured to shut down current supply from an auxiliary battery to the imaging apparatus from when ignition off of the vehicle is detected until the request signal is received.

According to the embodiment, an operation of the imaging apparatus after the ignition off is suppressed. Therefore, the supply of the dark current from the auxiliary battery to the imaging apparatus is eliminated and thus it is possible to suppress exhaustion of the auxiliary battery.

A third aspect of the disclosure relates to an information processing system. The information processing system includes the information processing apparatus, and an operation stop unit which is provided in the vehicle and configured to stop an operation of the imaging apparatus when a charging state of an auxiliary battery that supplies a current to the imaging apparatus becomes less than a predetermined threshold value from when an ignition off of the vehicle is detected until the request signal is received.

According to the embodiment, it is possible to continuously capture images inside and outside the vehicle for a certain period from when the ignition is turned off until the charging state of the auxiliary battery falls below a preset threshold value. Therefore, it is possible to provide the user with the images captured for a certain time after the ignition off while the difficulty of the engine start due to the exhaustion of the battery is prevented, and thus the user can leave the vehicle with more easy feeling.

A fourth aspect of the disclosure can be realized as an information processing program.

According to the disclosure, an effect is obtained in which it is possible to suppress the increase in the communication amount of the data to be uploaded from the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing an example of a user information DB 131;

FIG. 4 is a table showing examples of a reservation information DB 132;

FIG. 5 is a table showing examples of a use history information DB 133;

DETAILED DESCRIPTION OF EMBODIMENTS

Hereinafter, embodiments of the disclosure will be described with reference to drawings.

EMBODIMENT

Figure 1:
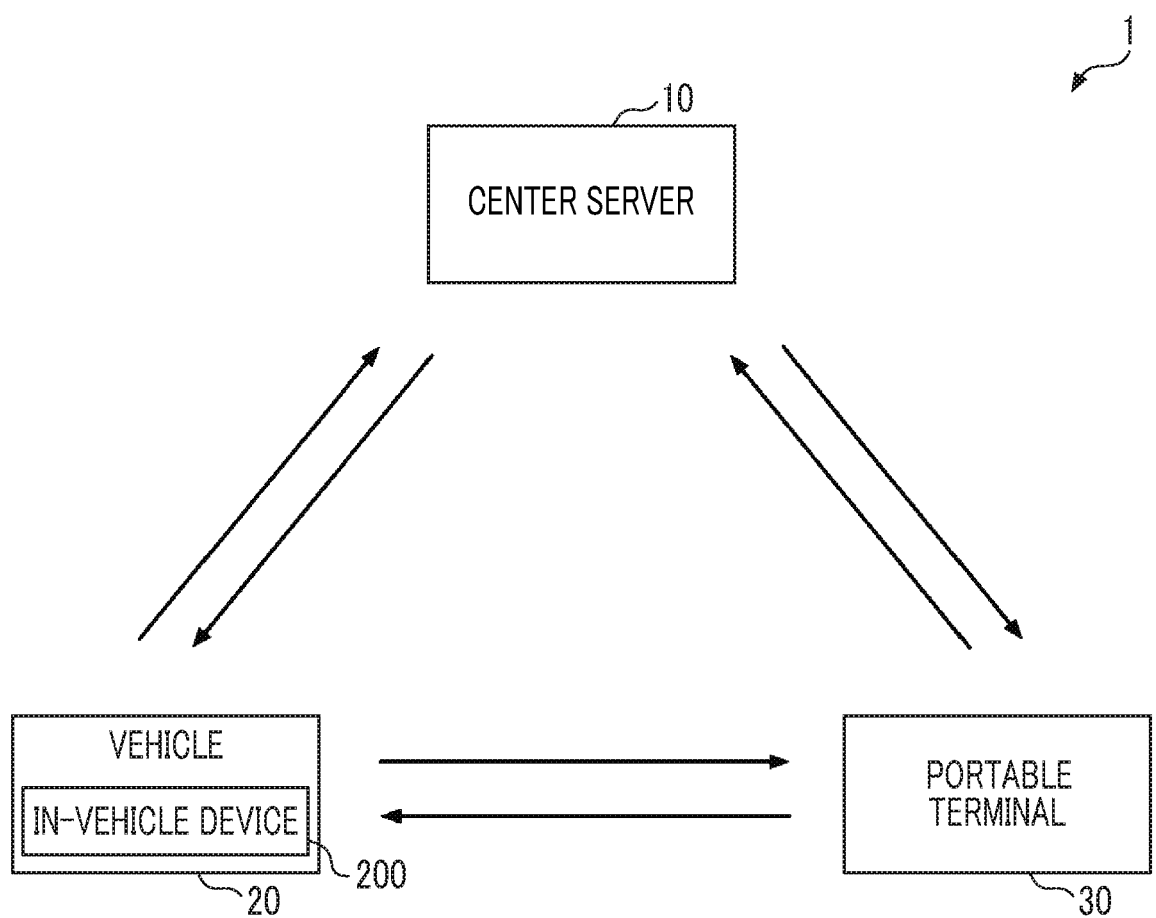
FIG. 1 is a diagram showing a configuration example of an information processing system 1 according to an embodiment of the disclosure.

FIG. 1 is a diagram showing a configuration example of an information processing system 1 according to the embodiment of the disclosure. The information processing system 1 includes an in-vehicle device 200 mounted on a vehicle 20, a portable terminal 30 which is a user terminal owned by a user of a vehicle, and a center server 10 which is an information processing apparatus capable of communicating with the in-vehicle device 200 and the portable terminal 30.

The vehicle 20 can perform wireless communication (short-range wireless communication) at a relatively short range with the portable terminal 30 in accordance with a predetermined communication standard. The vehicle 20 can transmit vehicle information such as position information and imaging data to the center server 10 by being connected to be communicable with the center server 10 through a predetermined communication network. Hereinafter, the vehicle 20 may be simply referred to as "vehicle" or "car". The vehicle is not limited to a passenger vehicle and may be a freight vehicle, a shared vehicle (for example, a bus), or the like.

Examples of the predetermined communication network include a mobile communication network having a number of base stations as terminals, a satellite communication network using a communication satellite, an Internet network.

Examples of the in-vehicle device 200 include a navigation apparatus, an audio apparatus, a communication circuit, an inverter, a motor electronic control unit (ECU), a hybrid ECU, an engine ECU, a motor, and auxiliary machines. The navigation apparatus displays a map and a host vehicle position on a display using position information and map data by using a global navigation satellite system (GNSS). The audio apparatus receives a broadcast radio wave from a radio or a television to output a sound or video thereof, reproduces music data stored on a compact disc (CD) or a digital versatile disk (DVD) to output a music thereof, or receives music data stored in the portable terminal 30 to output a music thereof from a speaker mounted on the vehicle 20.

The communication circuit performs the short-range wireless communication with the portable terminal 30 compliant with, for example, a Bluetooth (registered trademark) low energy (BLE) communication standard. The communication circuit may be communication means capable of performing the short-range communication with the portable terminal 30 and is not limited to communication means compliant with the BLE communication standard.

For example, a communication channel may be communication means compliant with a near field communication standard having a very short communicable distance such as near field communication (NFC), ZigBee (registered trademark), or ultra wide band (UWB). In the case, the communication channel may be built in a position close to a body surface outside a vehicle cabin of the vehicle 20 (for example, inside of door handle). Accordingly, it is possible to communicate with the portable terminal 30 outside the vehicle cabin using the communication channel. The communication circuit of the in-vehicle device 200 distributes an advertising packet periodically (for example, every several seconds) to establish a state in which communication compliant with a predetermined communication standard with the portable terminal 30 is possible. The advertising packet includes advertisement information. Examples of the advertisement information include a universally unique identifier (UUID) and a device ID. The UUID is, for example, an identifier (in-vehicle device ID) that uniquely identifies the in-vehicle device 200 on software and is information shared by the in-vehicle device 200 and the portable terminal 30. For example, when power of the in-vehicle device 200 is turned on, the communication circuit of the in-vehicle device 200 transmits an advertising packet which is data including the identifier with respect to the portable terminal 30. The portable terminal 30 that receives the advertising packet checks the UUID or the like included in the advertising packet to cause the communication circuit of the in-vehicle device 200 to establish the state in which the communication between the portable terminal 30 and the in-vehicle device 200 is possible.

The auxiliary machines include an air conditioner, a radiator fan, and a rear defogger, and the like. The device mounted on the vehicle 20 includes various sensors in addition to the above devices. The various sensors include a voltage sensor that detects a voltage input from a storage battery to the inverter, a voltage sensor that detects a voltage input from the inverter to the motor, a speed sensor that detects a vehicle speed, an accelerator sensor that detects an accelerator operation amount, a brake sensor that detects a brake operation amount, and the like.

The portable terminal 30 is a portable terminal that can be carried by an occupant (a driver, a passenger, or the like) of the vehicle 20. The portable terminal 30 is a cellular phone, a smartphone, a notebook computer, a personal handy-phone system (PHS), or the like. The portable terminal 30 communicates with the center server 10 through a predetermined communication network compliant with wireless communication standards such as global system for mobile communications (GSM: registered trademark), personal digital cellular (PDC), code division multiple access (CDMA), long term evolution (LTE), worldwide interoperability for microwave access (WiMAX), and the like. The "occupant" is also a user of the portable terminal 30 and thus may be referred to as a "user". Details of communication contents between the center server 10 and the portable terminal 30 will be described below. The portable terminal 30 can also perform the short-range wireless communication with the in-vehicle device 200 of the vehicle 20 in accordance with the wireless communication standard. The short-range wireless communication includes Bluetooth, wireless LAN (local area network), and the like.

The center server 10 is a server that provides various services. Examples of the various services include a car sharing service, an authentication key service, a trunk delivery service, and a B2C car sharing service.

Figure 2:
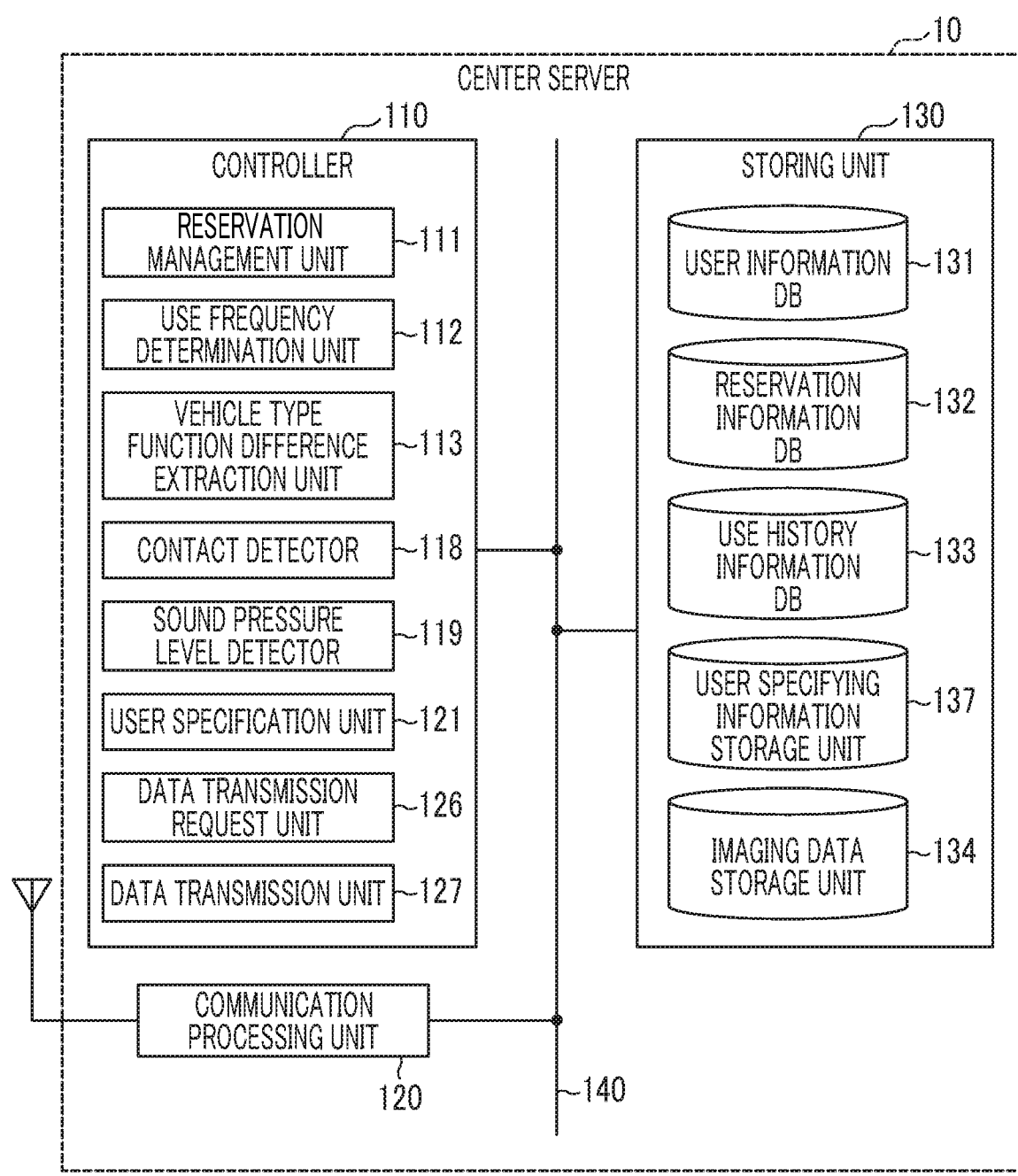
FIG. 2 is a diagram showing a configuration example of a center server 10.

FIG. 2 is a diagram showing a configuration example of the center server 10. The center server 10 includes a controller 110, a communication processing unit 120, a storing unit 130, and a bus line 140. The controller 110, the communication processing unit 120, and the storing unit 130 are connected to be communicable with each other through the bus line 140. FIG. 2 illustrates a function of the controller 110 and stored information of the storing unit 130 when the center server 10 is a server that provides the car sharing service, for example.

The controller 110 includes a reservation management unit 111, a use frequency determination unit 112, a vehicle type function difference extraction unit 113, a contact detector 118, a sound pressure level detector 119, and a user specification unit 121. The controller 110 includes a data transmission request unit 126 and a data transmission unit 127. The controller 110 includes a central processing unit (CPU), a read only memory (ROM), a random access memory (RAM), and an input and output interface (not shown). The CPU is a processor that controls the overall operation of the center server 10. The ROM stores a dedicated program for realizing functions of the center server 10 (reservation management unit 111, use frequency determination unit 112, vehicle type function difference extraction unit 113, contact detector 118, sound pressure level detector 119, user specification unit 121, data transmission request unit. 126, and the data transmission unit 127). The RAM is a memory used as a work area for the CPU. When the power is turned on, the CPU executes the dedicated program recorded in the ROM to realize various functions.

The reservation management unit 111 receives a reservation for the use of a vehicle from the user through the portable terminal 30.

The use frequency determination unit 112 determines a use frequency of a user for a vehicle type reserved by the user.

The vehicle type function difference extraction unit 113 extracts a function having the same function but different operation methods between the vehicle type reserved by the user and a vehicle type frequently used by the user and the operation methods thereof.

The contact detector 118 receives distance information indicating a distance value measured by a distance measurement unit described below to determine whether or not a distance from the vehicle to an object existing around the vehicle becomes zero based on the distance information. The object is a building or the like existing around the vehicle 20. The building refers to a building having a roof and a pillar or a wall, such as a house, a warehouse, a gate, and a wall, among constructions that settle on the land, a gate, a fence, or the like attached to the building, and a building facility. The object existing around the vehicle 20 may be any object that may cause damage to the body surface or a bottom surface of the vehicle 20 and is not limited to the above. Hereinafter, the "object existing around the vehicle" may be simply referred to as "object".

When determination is made that the distance from the vehicle to the object is zero, the contact detector 118 detects the contact of the vehicle with the object when a determination result input from the sound pressure level detector 119 (determination information indicating that sound pressure level exceeds predetermined threshold value) is input. The user specification unit 121 receives the detection result which is information indicating that the contact of the vehicle with the object is detected.

The sound pressure level detector 119 receives sound information transmitted from a sound collection unit described below to calculate a sound pressure level representing strength of the sound based on the sound information. Specifically, the sound pressure level detector 119 calculates any one of an absolute value of maximum amplitude in the sound information, an absolute value of average amplitude in the sound information, a maximum root mean square value of amplitude in the sound information, or a root mean square value of the amplitude in the sound information and calculates the calculated value as the sound pressure level.

The sound pressure level detector 119 determines whether or not the calculated sound pressure level exceeds a predetermined threshold value and inputs a determination result indicating that the sound pressure level exceeds the predetermined threshold to the contact detector 118 when determination is made that the sound pressure level exceeds the predetermined threshold.

When contact is detected by the contact detector 118, the user specification unit 121 specifies a user of a vehicle from which the contact is detected based on user identification information which is information for identifying the user of the vehicle. The user identification information is a user ID to be stored in a user information DB 131.

The user specification unit 121 generates table information and stores the generated table information in a user specifying information storage unit 137. The table information is, for example, information in which time point information at which the contact is detected is associated with user specifying information which is information representing the user of the vehicle from which the contact is detected. The association of the time point at which the contact is detected with the user specifying information enables an administrator of the car sharing service or a car rental service to easily specify a user who drives the vehicle when the contact occurs by checking a time point stored in the user specifying information storage unit 137 and also leads to prevention of false charge for users other than the user, even when a specific vehicle is used by a plurality of different users during a day. The table information is not limited to the above, for example, may be information in which solely user specifying information is recorded in order of time series with no association of the time point with the user specifying information. Even with the table information generated in this manner, it is possible to roughly specify the user who drives the vehicle when the contact occurs by checking a use history of the vehicle.

The information processing system 1 according to the embodiment may be configured to display the user specifying information on, for example, a screen (display unit 340) of the portable terminal owned by the administrator of the car sharing service or a screen of the terminal device of the car sharing service. In the case, the user specifying information may be stored in the user specifying information storage unit 137 or may be solely displayed on the portable terminal without being stored in the user specifying information storage unit 137. This is because it is possible to discriminate the user of the vehicle when the contact occurs solely by the display of the user specifying information and to suppress an increase in a memory capacity of the user specifying information storage unit 137.

When a predetermined request (imaging data transmission request) signal from the portable terminal 30 is received through the communication processing unit 120, the data transmission request unit 126 requests transmission of imaging data captured by an imaging apparatus (corresponding to an imaging unit 430 provided in the in-vehicle device 200) with respect to the in-vehicle device 200. The request signal is transmitted to the in-vehicle device 200 through the communication processing unit 120.

The imaging data transmitted from the in-vehicle device 200 is input to the data transmission unit 127 through the communication processing unit 120 in response to the imaging data transmission request from the data transmission request unit 126.

The data transmission unit 127 transmits (relays) the input imaging data to the portable terminal 30. In the portable terminal 30 that receives the imaging data, an image based on the imaging data is displayed on a screen of a dedicated application installed in the portable terminal 30. The image is an image inside the vehicle, an image near a vehicle body, an image around the outside of the vehicle, or the like.

The data transmission unit 127 may store the input imaging data in an imaging data storage unit 134 of the storing unit 130 simultaneously with transmitting the input imaging data to the portable terminal 30. The data transmission unit 127 may temporarily store the input imaging data in a buffer provided in the data transmission unit 127 simultaneously with transmitting the input imaging data to the portable terminal 30.

As described above, with the storing of the imaging data in the imaging data storage unit 134, the data transmission unit 127 can read out and transmit again the imaging data stored in the imaging data storage unit 134 when a retransmission request is received from the portable terminal 30 or when a response from the portable terminal 30 with respect to the reception of the imaging data does not reach a certain time, for example, even when a communication failure occurs between the center server 10 and the portable terminal 30. Accordingly, it is possible to reliably input the imaging data into the portable terminal 30, and thus user convenience is further improved.

The communication processing unit 120 transmits and receives data by the wireless communication. The communication processing unit 120 performs communication between the vehicle and the portable terminal 30.

The storing unit 130 stores information used by the controller 110. The storing unit 130 includes the user information DB 131, a reservation information DB 132, a use history information DB 133, the imaging data storage unit 134, and the user specifying information storage unit 137.

FIG. 3 is a table showing an example of the user information DB 131. The user information DB 131 stores a user ID, a password, a vehicle type of a private vehicle, and the like for each user. The private vehicle is a vehicle owned by a user and is a vehicle that the user usually uses. That is, the private vehicle is a vehicle frequently used by the user. In the user information DB 131, a user name, the user ID, the password, the vehicle type of the private vehicle, and the like are stored in association with the user.

The data to be stored in the user information DB 131 may be data input using the dedicated application installed in the portable terminal 30, for example. In the case, the data received by the portable terminal 30 is transmitted to the center server 10 from the portable terminal 30. The data to be stored in the user information DB 131 may be data input to a terminal device of a store that sells the private vehicle. In the case, the data received by the terminal device of the store is transmitted to the center server 10 from the terminal device of the store.

FIG. 4 is a table showing examples of the reservation information DB 132. The reservation information DB 132 stores reservation information for each of a plurality of vehicles. FIG. 4 shows reservation information for a vehicle A (vehicle type a) and reservation information for three vehicles other than the vehicle A. The reservation information includes a rental date and time of the vehicle, a rental place, a return date and time, a return place, a user name who reserves the vehicle, and the like. The reservation information DB 132 stores the vehicle rental date and time, the rental place, the return date and time, the return place, and the like in association with the user name who reserves the vehicle. The information to be stored in the reservation information DB 132 is not limited to the above information, and the reservation information DB 132 may include, for example, an e-mail address of the portable terminal 30 owned by the user who reserves the vehicle.

FIG. 5 is a table showing examples of the use history information DB 133. The use history information DB 133 stores use history information of each of a plurality of users. FIG. 5 shows use history information of a user AAA and use history information of three users other than the user AAA. The use history information DB 133 stores a vehicle type used by the user in the past, a use start date and time, a use end date and time, and the like in association with a user name who uses the vehicle. The number of uses of the vehicle type may be calculated by the user based on the use history information DB 133. The information to be stored in the use history information DB 133 is not limited to the above information, and the use history information DB 133 may include, for example, information on the number of uses of each of a plurality of vehicle types.

Figure 6:
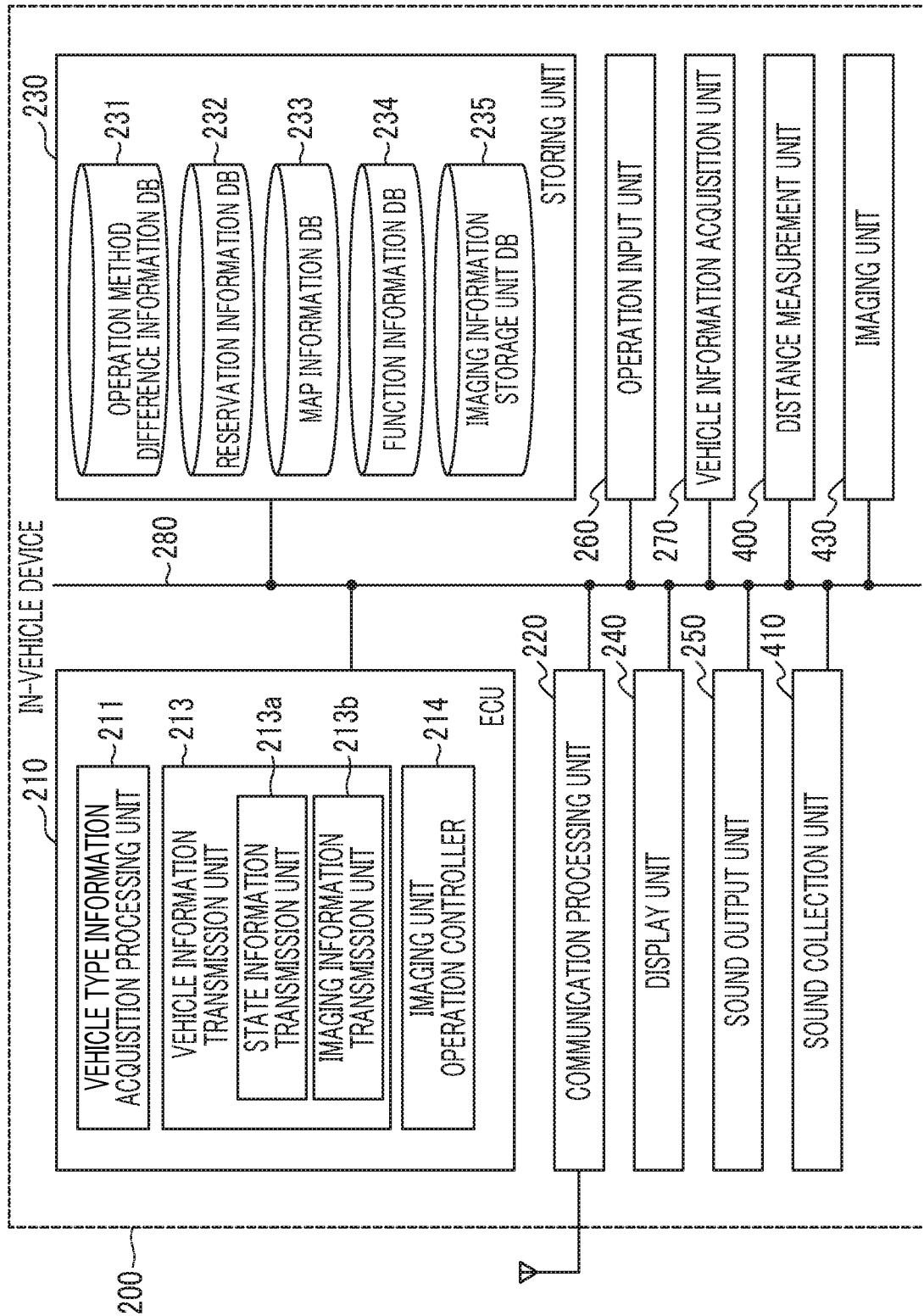
FIG. 6 is a diagram showing a configuration example of an in-vehicle device 200.

Next, a configuration of the in-vehicle device 200 will be described with reference to FIG. 6 and the like. FIG. 6 is a diagram showing a configuration example of the in-vehicle device 200. The in-vehicle device 200 includes an ECU 210, a communication processing unit 220, a storing unit 230, a display unit 240, a sound output unit 250, an operation input unit 260, a vehicle information acquisition unit 270, an in-vehicle network 280 based on a communication protocol such as controller area network (CAN), a distance measurement unit 400, a sound collection unit 410, and the imaging unit 430.

The ECU 210, the communication processing unit 220, the storing unit 230, the display unit 240, the sound output unit 250, the operation input unit 260, the vehicle information acquisition unit 270, the distance measurement unit 400, the sound collection unit 410, and the imaging unit 430 are connected to be communicable with each other through the in-vehicle network 280.

The ECU 210 includes a CPU, a ROM, a RAM, and an input and output interface (not shown). The CPU is a processor that controls the overall operation of the in-vehicle device 200. The ROM stores a dedicated program for realizing functions of the in-vehicle device 200 (the vehicle type information acquisition processing unit 211, the vehicle information transmission unit 213, and the imaging unit operation controller 214). The RAM is a memory used as a work area for the CPU. When the power is turned on, the CPU executes the dedicated program recorded in the ROM to realize various functions.

The vehicle type information acquisition processing unit 211 acquires information on operation methods that are different from each other for each function of a vehicle type frequently used by the user, from the center server 10 or the portable terminal 30. The vehicle type information acquisition processing unit 211 stores the acquired information in an operation method difference information DB 231.

The vehicle information transmission unit 213 includes a state information transmission unit 213*a* and an imaging information transmission unit 213*b*, and transmits vehicle information to the center server 10 when a request from the center server 10 is input through the communication processing unit 220. Examples of the vehicle information include information related to a state of the vehicle 20 and imaging data.

When a transmission request for the information related to the state of the vehicle 20 is received, the state information transmission unit 213*a* of the vehicle information transmission unit 213 transmits the information related to the state of the vehicle 20 acquired by the vehicle information acquisition unit 270 to the center server 10 through the communication processing unit 220, for example.

The information related to the state of the vehicle 20 includes detection information detected by the various sensors. The detection information includes a temperature around an engine, information indicating a lock state (locked or unlocked) of the vehicle door, and information indicating a light-on state (light-on or light-off) of a hazard lamp, and is acquired (collected) by the vehicle information acquisition unit 270.

For example, even when the user forgets to lock the vehicle door after the ignition of the vehicle is turned off, the information related to the state of the vehicle 20 (vehicle information) is transmitted to the portable terminal 30 through the center server 10, for example, when the dedicated application installed on the portable terminal 30 is activated and performs the transmission request for the information related to the state of the vehicle 20. Accordingly, it is possible for the user to check the lock state of the vehicle door through an icon on a screen activated by the dedicated application of the portable terminal 30. A display example of the icon will be described below.

Similarly, even when the user forgets to turn off the hazard lamp after the ignition of the vehicle is turned off, it is possible for the user to check a state of the hazard lamp through the icon on the screen activated by the dedicated application of the portable terminal 30, for example, when the dedicated application performs the transmission request for the information related to the state of the vehicle 20.

It is also possible to remotely operate some functions of the vehicle by operating icons on the screen of the dedicated application by the user. For example, when a door icon (for example, a figure that can select whether to lock or unlock the vehicle door) is operated, the vehicle receives a door lock command from the portable terminal 30 through the center server 10. Accordingly, it is possible to remotely lock the vehicle door.

When a hazard icon (for example, a figure that can select whether to turn the light on or off the hazard lamp) is operated, the vehicle receives a hazard lamp turn-off command from the portable terminal 30 through the center server 10. Accordingly, it is possible to remotely turn off the hazard lamp.

A technique for remotely operating the vehicle with the portable terminal 30 is disclosed in, for example, Japanese Unexamined Patent Application Publication No. 2018-204472 (JP 2018-204472 A). Therefore, a detailed description thereof is omitted.

When a transmission request for the imaging data is received, the imaging information transmission unit 213*b* of the vehicle information transmission unit 213 transmits imaging data captured by the imaging unit 430 or imaging data stored in an imaging information storage unit 235 to the center server 10 through the communication processing unit 220. The imaging information transmission unit 213*b* may temporarily read the imaging data captured by the imaging unit 430 or the imaging data stored in the imaging information storage unit 235 and then transmit the imaging data to the center server 10 through the communication processing unit 220. Alternatively, the imaging unit 430 may be requested to transmit the imaging data to the center server 10 through the communication processing unit 220.

For example, even when the user leaves the vehicle after the ignition of the vehicle is turned off, the imaging data is transmitted to the portable terminal 30, for example, when the dedicated application installed in the portable terminal 30 is activated and performs the transmission request for the imaging data. Accordingly, it is possible for the user to check an image captured by the imaging unit 430 through the screen activated by the dedicated application of the portable terminal 30.

When the transmission request for the imaging data is performed, a camera icon on the screen activated by the dedicated application of the portable terminal 30 (for example, a figure that receives a user operation to display a captured image on the display unit 340 of the portable terminal 30) is operated.

In this manner, with the imaging information transmission unit 213*b* of the vehicle information transmission unit 213, it is possible for the user who leaves the vehicle to check whether there is a suspicious person near the vehicle, whether a valuable is left behind in the vehicle, weather states (including snowfall state and rainfall state) around the vehicle, and the like, through the display unit 340 of the portable terminal.

The communication processing unit 220 is a communication module based on, for example, a data communication module (DCM) which is an in-vehicle communication standard, worldwide interoperability for microwave access (WiMAX) which is the wireless communication standard. The communication processing unit 220 can perform bidirectional communication with the center server 10 and the portable terminal 30 through a predetermined communication network.

For example, when the ignition off is detected based on the vehicle information, the imaging unit operation controller (current shutdown unit) 214 shuts down supply of a dark current from an auxiliary battery to the imaging unit 430 from when the ignition off is detected until the communication processing unit 220 receives the imaging data transmission request to stop the operation of the imaging unit 430.

The imaging unit operation controller 214 stops the operation of the imaging unit 430, then monitors whether or not the communication processing unit 220 receives the imaging data transmission request. When the imaging data transmission request is received, the imaging unit operation controller 214 restarts the supply of the dark current from the auxiliary battery to the imaging unit 430 in order to activate the imaging unit 430.

Power consumption of the imaging unit 430 after the ignition off is in a range from several [W] to several tens [W] depending on a specification of the imaging unit 430, a monitoring mode, and the like. Therefore, when the imaging unit 430 operates continuously after the ignition off, the engine may be difficult to start due to auxiliary battery exhaustion caused by the dark current (discharge current when the system is off) supplied from the auxiliary battery to the imaging unit 430.

The operation of the imaging unit 430 after the ignition off is suppressed by providing the imaging unit operation controller 214. Therefore, the supply of the dark current from the auxiliary battery to the imaging unit 430 is eliminated and thus it is possible to suppress the exhaustion of the auxiliary battery.

The configuration example of the imaging unit operation controller 214 is not limited thereto. For example, the imaging unit operation controller 214 may be configured as an operation stop unit. In the case, the imaging unit operation controller 214 monitors a charging state (SOC) of the auxiliary battery after the ignition off. When the charging state of the auxiliary battery is less than a preset threshold value (for example, any value from 15% to 30%), the imaging unit operation controller 214 stops the operation of the imaging unit 430 to shut down the supply of the dark current from the auxiliary battery to the imaging unit 430.

The SOC of the auxiliary battery varies depending on use states of the vehicle (previous traveling distance and traveling situation of the vehicle, elapsed time from the previous ignition off, and the like). Therefore, the threshold value may be set as a value derived by a simulation or the like in advance in view of these variation conditions or may be a value obtained by performing machine learning in the in-vehicle device 200.

With the above configuration, it is possible to record a certain period (for example, from several hours to several tens of hours) from when the ignition is turned off until the charging state of the auxiliary battery falls below the preset threshold value in the imaging information storage unit 235 by continuously capturing the images inside and outside the vehicle. For this reason, it is possible to provide the user with the images captured for a certain time after the ignition off while the difficulty of the engine start due to the exhaustion of the battery is prevented, and thus the user can leave the vehicle with more easy feeling.

The storing unit 230 stores information used by the ECU 210 and the like. The storing unit 230 includes the operation method difference information DB 231, a reservation information DB 232, a map information DB 233, a function information DB 234, and the imaging information storage unit 235.

The distance measurement unit 400 is a sensor that measures a distance from the vehicle to the object existing around the vehicle. The distance measurement unit 400 is, for example, a clearance sonar or a radar sensor.

For example, the clearance sonar is provided on the right and left sides of a front portion of the vehicle, respectively and further provided on each of the right and left sides of a rear portion of the vehicle, respectively. The clearance sonar transmits an ultrasonic wave to a front side or rear side of the vehicle, detects the object existing around the vehicle based on a reflected wave of the ultrasonic wave, and outputs sonar information according to the detection result. The sonar information includes information representing a distance from a current position of the vehicle to an installation position of the object.

The radar sensor is provided on the front portion and rear portion of the vehicle, respectively. The radar sensor transmits a detection wave other than the ultrasonic wave (for example, an electromagnetic wave such as a millimeter wave or a laser) to the front side or rear side of the vehicle and detects the object existing around the vehicle based on a reflected wave. When a laser is used, the radar sensor is, for example, laser imaging detection and ranging (LIDAR). The radar sensor outputs radar information according to a detection result of an obstacle. The radar information includes information representing the distance from the current position of the vehicle to the installation position of the object, information representing a relative speed between the vehicle and the object, and the like.

The sound collection unit 410 is a sound detection microphone that collects a sound around the vehicle, detects the sound as a vibration waveform, and inputs a signal indicating the detected vibration waveform to the sound pressure level detector 119 of the center server 10 as the sound information. The sound around the vehicle is a sound generated when the vehicle lightly touches or makes a rear-end collision with the object existing around the vehicle. The sound information is input from the in-vehicle device 200 of the vehicle to the sound pressure level detector 119 through the communication processing unit 120 and the bus line 140 of the center server 10.

The operation method difference information DB 231 stores the information on the operation methods that are different from each other for each function of the vehicle type frequently used by the user. An operation method having a high priority is preferentially guided when the function operation method is guided. The priority may be determined in advance in the function information DB 234. The operation method difference information DB 231 may store information on the mutually same operation method for each function of the vehicle type frequently used by the user.

The map information DB 233 stores map information used when the in-vehicle device 200 provides route guidance. The map information includes information such as a road and a facility.

The function information DB 234 stores information such as a vehicle state when each function of the vehicle is used. Examples of the vehicle state include "engine is started", "current position is a gas station and vehicle is stopped", and "shift lever is in a reverse mode". In the function information DB 234, the vehicle state and the function of the vehicle to be used in the state are stored in association with each other. In the function information DB 234, a vehicle operation method and a vehicle state are stored in association with each of a plurality of functions. In the function information DB 234, information such as a plurality of states may be stored for one function. The function information DB 234 may have priority information for each function.

The imaging information storage unit 235 stores imaging information. The imaging information includes imaging data captured by the imaging unit 430, time point information indicating a time point when the imaging data is generated, and the like. The imaging data is image data inside the vehicle, image data near the vehicle body, image data around the vehicle, and the like.

The display unit 240 performs a display based on display screen data transmitted from the ECU 210 or the like. The display unit 240 is a display device such as a liquid crystal display (LCD) or an organic electroluminescence (EL) display.

The sound output unit 250 performs sound output based on sound data transmitted from the ECU 210 or the like. The sound output unit 250 is, for example, a speaker.

The operation input unit 260 receives a command for the in-vehicle device 200 from the user. The operation input unit 260 is, for example, various switches, a touch sensor, a sound input apparatus, or the like.

The vehicle information acquisition unit 270 acquires information on the vehicle state and the like from a sensor or the like of each portion of the vehicle. A configuration example of the vehicle information acquisition unit 270 will be described with reference to FIG. 7.

Figure 7:
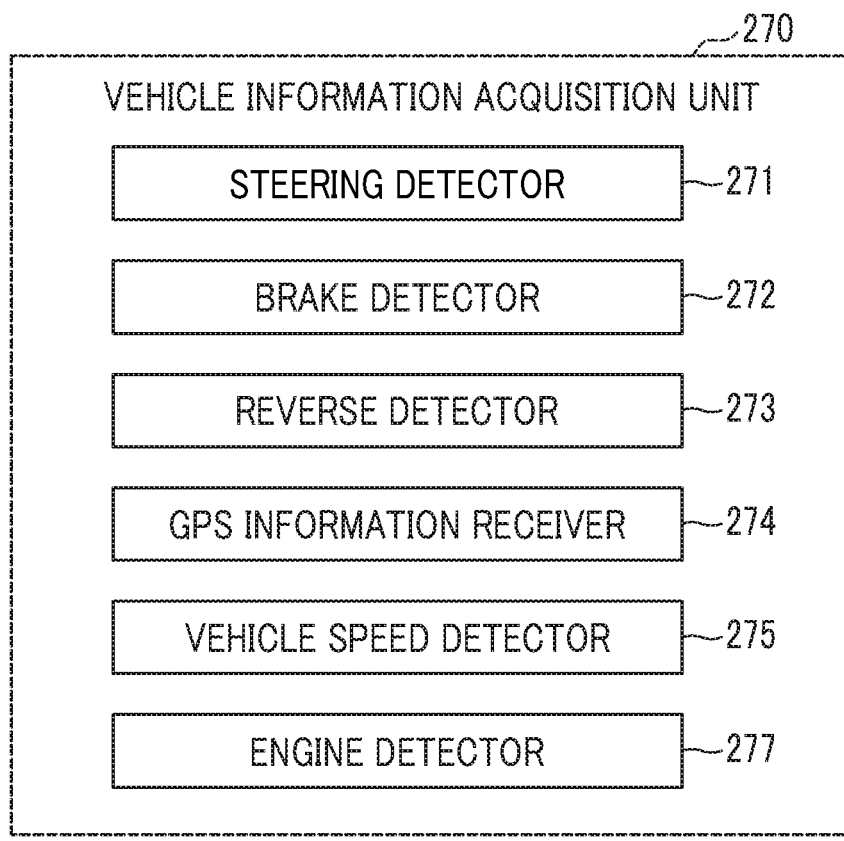
FIG. 7 is a diagram showing an example of a vehicle information acquisition unit 270.

FIG. 7 is a diagram showing an example of the vehicle information acquisition unit 270. In the example in FIG. 7, the vehicle information acquisition unit 270 includes a steering detector 271, a brake detector 272, a reverse detector 273, a GPS information receiver 274, a vehicle speed detector 275, and an engine detector 277. The vehicle information acquisition unit 270 may include another detector, a sensor, or the like. The vehicle information acquisition unit 270 may include, for example, a fuel sensor, a water temperature sensor, a rain sensor, a road surface sensor, a visibility sensor, an atmospheric pressure sensor, and a light and darkness sensor.

The steering detector 271 detects a steering pulse signal generated according to a steering rotation angle. The steering detector 271 transmits the detected steering pulse signal to the ECU 210. The steering pulse signal detected by the steering detector 271 is output, for example, every time the steering rotates by a predetermined angle. The steering detector 271 electrically detects the steering pulse signal through a terminal.

The brake detector 272 detects whether or not a vehicle parking brake is applied. The brake detector 272 notifies the ECU 210 of the detection result. The brake detector 272 detects whether or not the parking brake is applied, for example, based on a conduction state of a switch that is turned on and off in conjunction with a movement of a parking brake lever (or parking brake pedal). For example, the brake detector 272 electrically detects the conduction state of the switch through the terminal.

The reverse detector 273 detects whether or not the shift lever of the vehicle is in the reverse mode. The reverse detector 273 notifies the ECU 210 of the detection result. For example, the reverse detector 273 detects whether or not the shift lever is in the reverse mode based on the conduction state of a switch that is turned on and off in conjunction with the shift lever. For example, the reverse detector 273 electrically detects the conduction state of the switch through the terminal.

The GPS information receiver 274 receives a radio wave signal from a GPS satellite received by a global positioning system (GPS) antenna connected to the terminal and transmits the received signal to the ECU 210. The GPS is a system that measures a position of the GPS antenna based on radio waves from at least three GPS satellites out of many GPS artificial satellites that orbit the earth.

Here, a positioning system using GPS is adapted as the GNSS. However, the GNSS is not limited to the GPS, and a positioning system using a satellite such as Galileo or global navigation satellite system (GLONASS) may be used. The GNSS is a positioning system in which a positioning apparatus mounted on a moving body measures a position of the moving body using the signals from the satellites.

The vehicle speed detector 275 detects a vehicle speed pulse signal generated according to a rotation angle of an axle. The vehicle speed detector 275 transmits the detected vehicle speed pulse signal to the ECU 210. The vehicle speed pulse signal detected by the vehicle speed detector 275 is a step-like pulse signal output from the vehicle speed sensor or an electronic control unit that controls the vehicle engine or brake. The vehicle speed pulse signal is output, for example, every time the axle rotates by a predetermined angle. A relationship between the vehicle speed pulse signal and a movement distance of the vehicle changes depending on a manufacturer of a vehicle, a vehicle type, a size of a wheel mounted on the vehicle, an air pressure, and the like. For this reason, the ECU 210 may correct as appropriate the vehicle speed by the detected vehicle speed pulse signal detected based on the movement distance of the vehicle calculated based on the positioning result by GPS. The vehicle speed detector 275 electrically detects the vehicle speed pulse signal through the terminal.

The engine detector 277 detects whether or not the engine is driven. The engine detector 277 notifies ECU 210 of the detection result. For example, the engine detector 277 detects whether or not the engine is driven by the conduction state of a switch that is turned on and off in conjunction with an engine rotation. The engine detector 277 electrically detects the conduction state of the switch through the terminal.

Returning to FIG. 6, the imaging unit 430 is an omnidirectional camera, a panorama camera, or the like that captures images of the entire interior of the vehicle, scenery near an outer peripheral portion of the vehicle, and the like. An example of the imaging unit 430 includes an imaging element such as a charge-coupled device (CCD) or a complementary metal oxide-semiconductor (CMOS). The scenery near the outer peripheral portion of the vehicle is a scene of a front end portion of the vehicle (for example, outer peripheral surface of front bumper) and surroundings of the front end portion, a scene of a rear end portion of the vehicle (for example, outer peripheral surface of rear bumper) and surroundings of the rear end portion, and the like. The scenery near the outer peripheral portion of the vehicle may include a scene outside the vehicle in a vehicle width direction.

Figure 8:
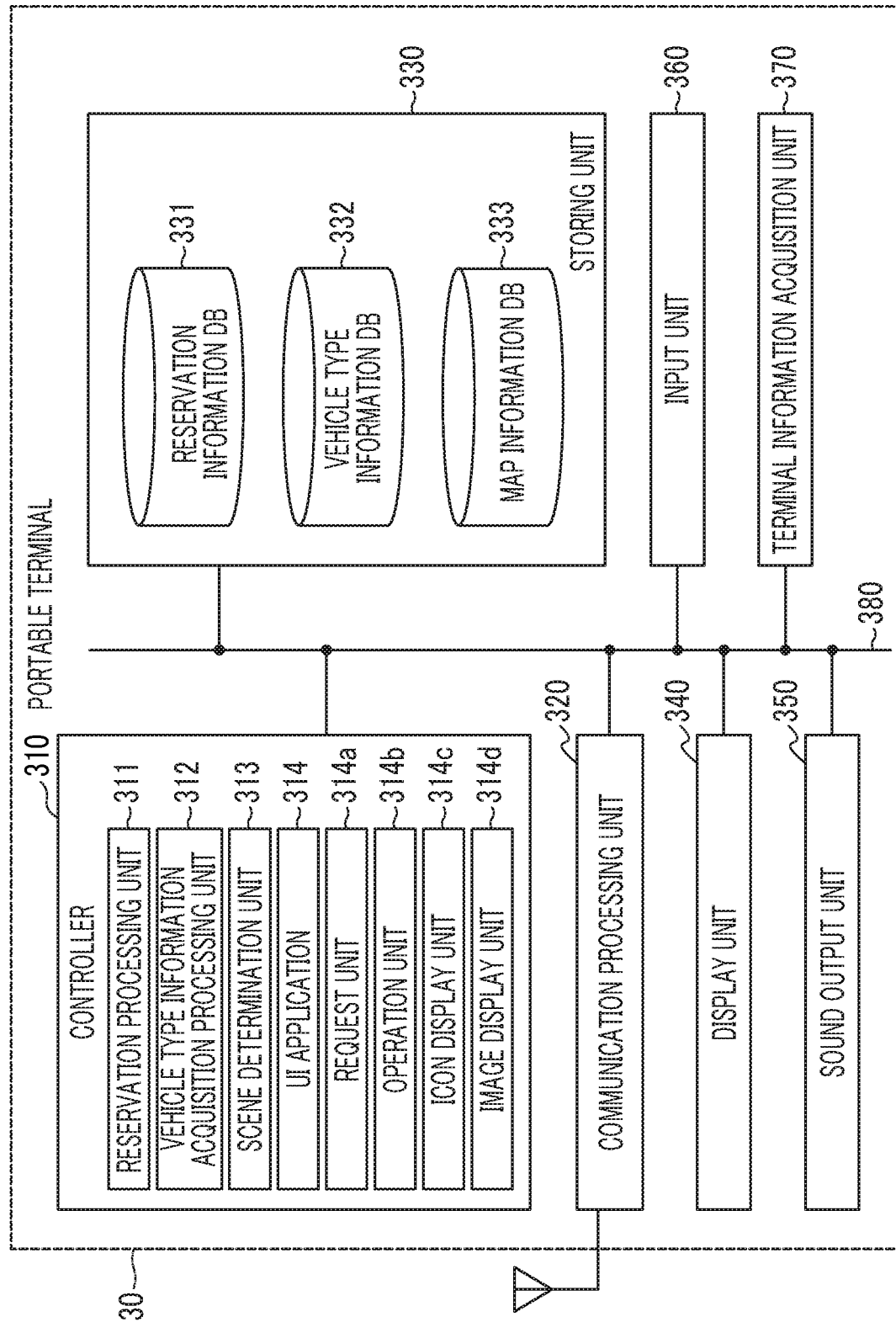
FIG. 8 is a diagram showing a configuration example of a portable terminal 30.

Next, a configuration of the portable terminal 30 will be described with reference to FIG. 8. FIG. 8 is a diagram showing a configuration example of the portable terminal 30. The portable terminal 30 includes a controller 310, a communication processing unit 320, a storing unit 330, a display unit 340, a sound output unit 350, an input unit 360, a terminal information acquisition unit 370, and a bus line 380. The controller 310, the communication processing unit 320, the storing unit 330, the display unit 340, the sound output unit 350, the input unit 360, and the terminal information acquisition unit 370 are connected to be communicable with each other through the bus line 380.

The controller 310 includes a CPU, a ROM, a RAM, and an input and output interface (not shown). The CPU is a processor that controls the overall operation of the portable terminal 30. The ROM stores a dedicated program for realizing functions of the portable terminal 30 (reservation processing unit 311, vehicle type information acquisition processing unit 312, scene determination unit 313, UI application 314). The RAM is a memory used as a work area for the CPU. When the power is turned on, the CPU executes the dedicated program recorded in the ROM to realize various functions.

The reservation processing unit 311 receives a vehicle use reservation from the user and performs a user vehicle use reservation processing with respect to the center server 10.

The vehicle type information acquisition processing unit 312 receives the function operation method of the vehicle from the center server 10 and stores the method in the vehicle type information DB 332.

The scene determination unit 313 determines the vehicle state and the like according to information (position information and acceleration information) from the terminal information acquisition unit 370 or the like, the map information, or the like. The scene determination unit 313 guides an appropriate function operation method according to the vehicle state through the display unit 340 and the sound output unit 350.

The UI application 314 includes an application program capable of performing an operation by the user of the portable terminal 30, the dedicated application described above, and the like. The dedicated application is installed to configure a request unit 314a that generates a request signal for requesting provision of imaging data, an operation unit 314b that generates an operation command for remotely operating the in-vehicle device 200, an icon display unit 314c that displays a predetermined icon on a screen of the dedicated application, an image display unit 314d that displays an image captured by the imaging unit 430 on the display unit 340 of the portable terminal 30 based on the imaging data transmitted from the in-vehicle device 200.

The communication processing unit 320 transmits and receives data by the wireless communication. The communication processing unit 320 performs communication between the center server 10 and the vehicle. The communication processing unit 320 may transmit and receive data by wired communication. For example, the communication processing unit 320 may be connected to the vehicle by wire to transmit and receive the data.

The storing unit 330 stores information used by the controller 310. The storing unit 330 includes a reservation information DB 331, the vehicle type information DB 332, and a map information DB 333.

The reservation information DB 331 stores reservation information included in reservation completion notification received from the center server 10.

The vehicle type information DB 332 stores the vehicle type reserved by the user and the vehicle type frequently used by the user. The vehicle type information DB 332 may store a function operation method for each vehicle type. The function operation method for each vehicle type is acquired from the center server 10, for example.

The map information DB 333 stores the map information used for the route guidance or the like. The map information includes information such as a road and a facility.

The display unit 340 performs a display based on display screen data transmitted from the controller 310 or the like. The display unit 340 is a display device such as the LCD or the organic EL display.

The sound output unit 350 performs sound output based on sound data transmitted from the controller 310 or the like. The sound output unit 350 is, for example, a speaker.

The input unit 360 receives a command from the user. The input unit 360 is, for example, various switches, a touch sensor, a sound input apparatus, or the like.

The terminal information acquisition unit 370 acquires information related to a portable terminal state and the like from a sensor or the like of each portion of the portable terminal 30. A configuration of the terminal information acquisition unit 370 will be described with reference to FIG. 9.

Figure 9:
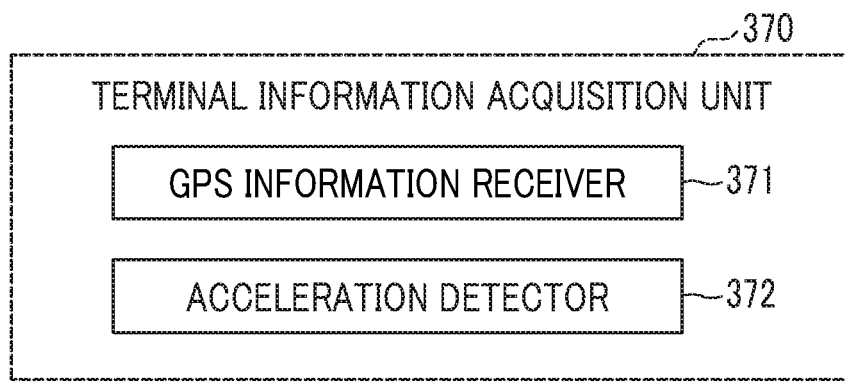
FIG. 9 is a diagram showing an example of a terminal information acquisition unit 370.

FIG. 9 is a diagram showing an example of the terminal information acquisition unit 370. The terminal information acquisition unit 370 includes a GPS information receiver 371 and an acceleration detector 372. The terminal information acquisition unit 370 may include another detector, a sensor, or the like.

The GPS information receiver 371 receives a radio wave signal from a GPS satellite received by a GPS antenna connected to a terminal and transmits the received signal to the controller 310. The GNSS is not limited to the GPS, and the positioning system using the satellite such as Galileo or GLONASS may be used.

The acceleration detector 372 detects an acceleration pulse signal generated according to acceleration of the portable terminal 30. The acceleration detector 372 transmits the detected acceleration pulse signal to the controller 310. The acceleration pulse signal detected by the acceleration detector 372 is a pulse signal output from an acceleration sensor or the like. The acceleration of the portable terminal 30 is calculated from the acceleration pulse signal. When the acceleration is calculated, a movement speed and movement distance of the portable terminal 30 are calculated. The acceleration, movement speed, and movement distance of the portable terminal 30 in the vehicle can be regarded as the same as the acceleration, movement speed, and movement distance of the vehicle unless the portable terminal 30 is moved vigorously in the vehicle. The controller 310 may correct as appropriate the acceleration by the detected acceleration pulse signal based on the movement distance of the portable terminal 30 calculated based on the positioning result by GPS. The acceleration detector 372 electrically detects the acceleration pulse signal through the terminal.

Figure 10:
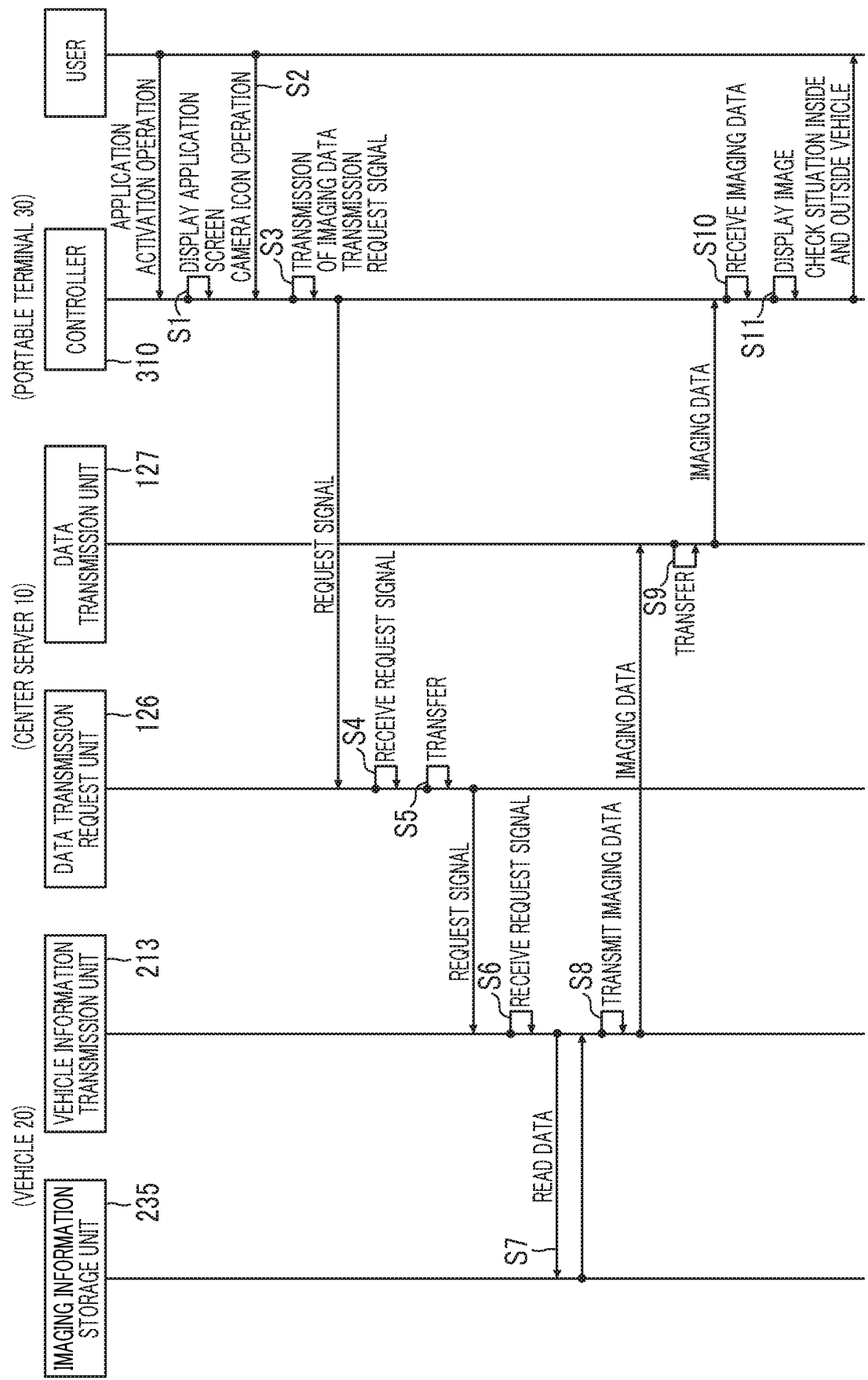
FIG. 10 is a flowchart for describing an operation from when a transmission request for imaging data is generated until an image based on the imaging data is displayed on the portable terminal 30.
Figure 11:
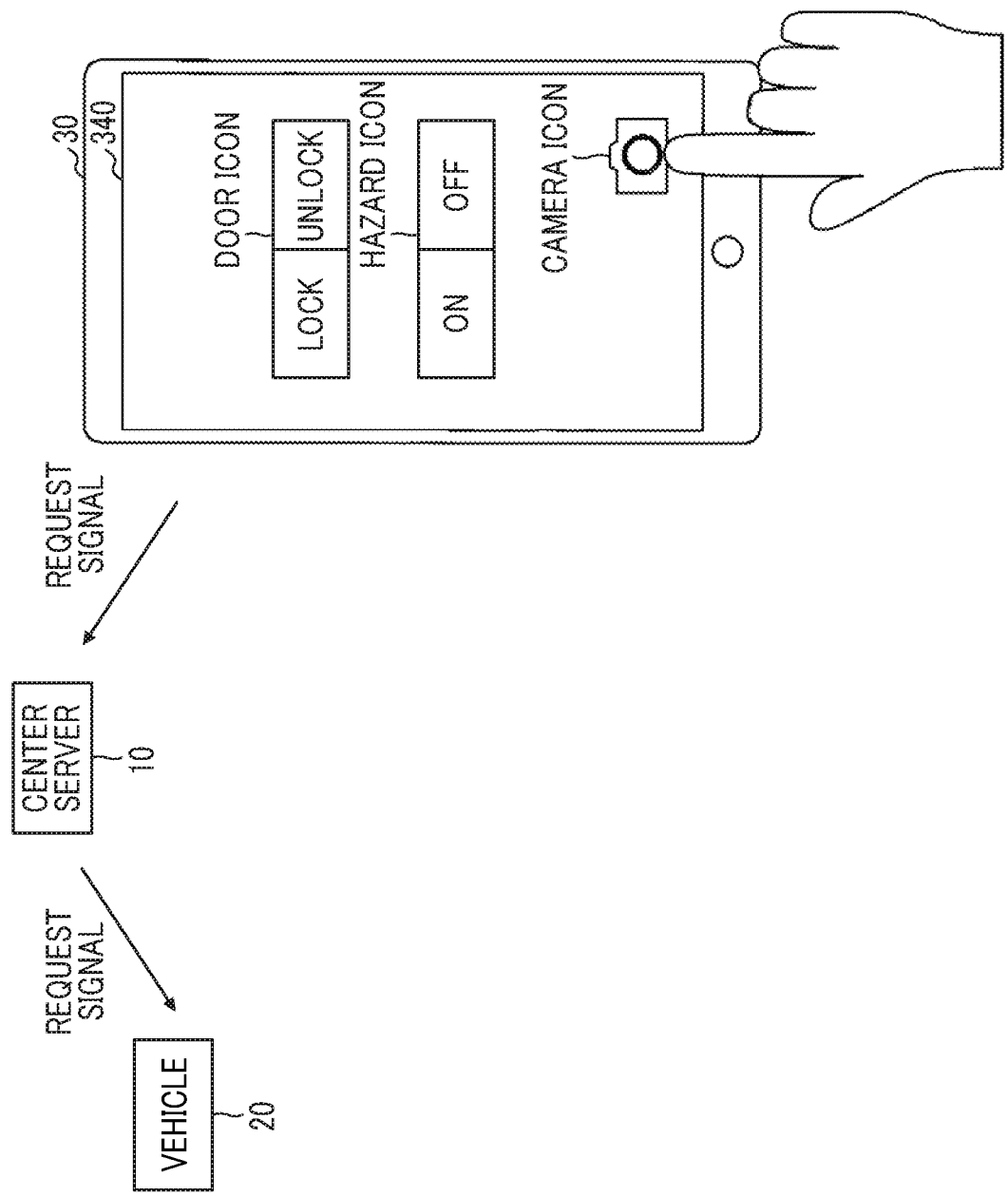
FIG. 11 is a diagram schematically representing a state until a transmission request for imaging data reaches a vehicle.
Figure 12:
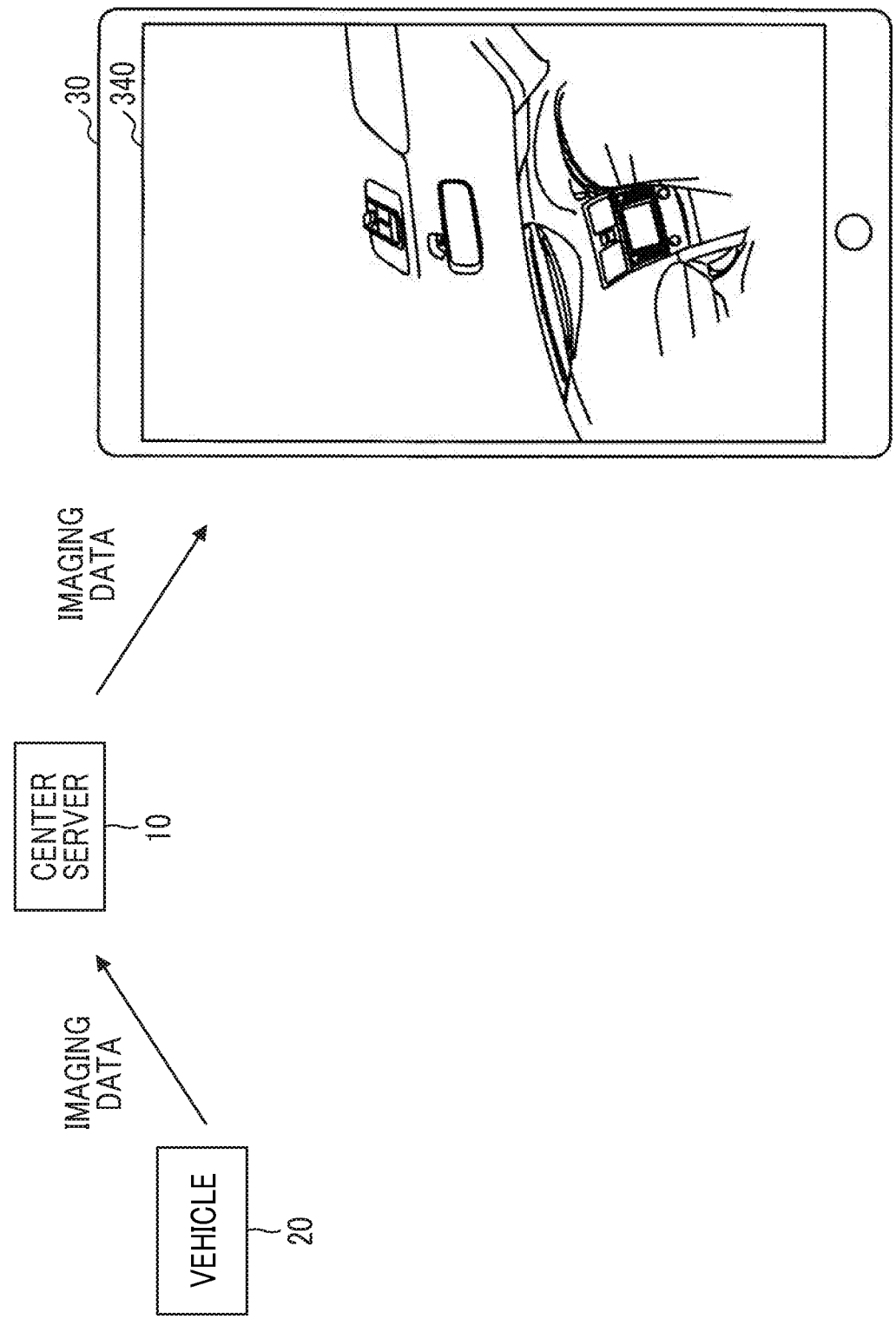
FIG. 12 is a diagram schematically representing a state until imaging data reaches the portable terminal 30 in response to a transmission request for imaging data.
Figure 13:
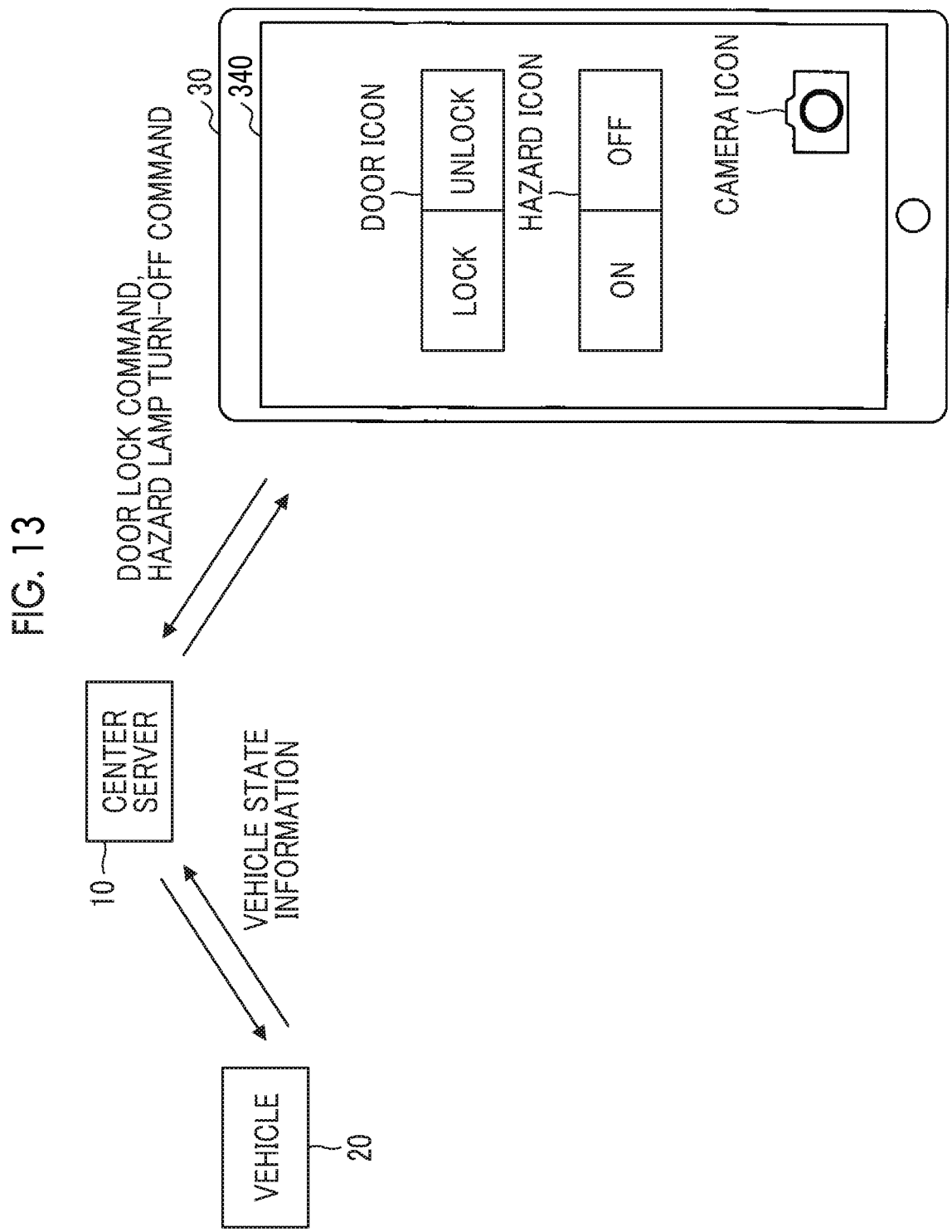
FIG. 13 is a diagram schematically representing a state in which vehicle information (vehicle state information) other than imaging data is input to the portable terminal 30.

Next, an operation for transmitting the imaging data to the portable terminal 30 will be described with reference to FIGS. 10 to 13. FIG. 10 is a flowchart for describing an operation from when the transmission request for the imaging data is generated until an image based on the imaging data is displayed on the portable terminal 30. FIG. 11 is a diagram schematically representing a state until the transmission request for the imaging data reaches the vehicle. FIG. 12 is a diagram schematically representing a state until the imaging data reaches the portable terminal 30 in response to the transmission request for the imaging data. FIG. 13 is a diagram schematically representing a state in which vehicle information (vehicle state information) other than the imaging data is input to the portable terminal 30.

When the user performs an operation for activating the application in order to display the screen of the dedicated application on the display unit of the portable terminal 30, the application screen is displayed on the portable terminal 30 (step S1). Thereafter, when the camera icon to be displayed on the screen is, for example, touched as shown in FIG. 11 (step S2), a transmission request signal for the imaging data is generated by the controller 310 and is transmitted to the center server 10 (step S3).

When the request signal is received (step S4), the data transmission request unit 126 of the center server 10 transfers the request signal to the vehicle 20 (step S5).

When the request signal is received (step S6), the vehicle information transmission unit 213 of the vehicle 20 reads the imaging data generated by the imaging unit 430 (step S7) and transmits the data to the center server 10 (step S8).

After step S8, the data transmission unit 127 transfers the received imaging data to the portable terminal 30 (step S9). When the imaging data is received (step S10), the controller 310 of the portable terminal 30 displays the image based on the imaging data on the screen of the dedicated application as shown in FIG. 12 (step S11). Accordingly, it is possible for the user to check situations inside and outside the vehicle with the image based on the imaging data.

In step S7, the vehicle information transmission unit 213 of the vehicle 20 may read the imaging data from the imaging unit 430 in real time, or may read out, for example, imaging data at a specific time point or time zone set on the screen of the dedicated application or imaging data corresponding to a time point indicated by time point data by referring to the time point data recorded in the imaging information storage unit 235 from the imaging information storage unit 235.

For example, a time point two hours before a current time point is designated on the screen of the dedicated application to enable a still image based on imaging data captured at a specific time point two hours before to be reproduced. Accordingly, it is possible for the user to check the images inside and outside the vehicle based on the imaging data at any time point while an increase in a data reception amount is suppressed.

In addition, a time zone from two hours before a current time point to two hours and ten minutes before the current time point is designated on the screen of the dedicated application to enable a moving image based on imaging data captured in the time zone to be reproduced. Accordingly, it is possible for the user to check the detailed images inside and outside the vehicle based on the imaging data in any time zone.

FIG. 13 describes information (vehicle state information) to be transmitted from the vehicle when the above door icon, hazard icon, or the like is operated.

In a case where the door icon in FIG. 13 is, for example, in an "UNLOCK" state based on the vehicle state information, when a region marked "LOCK" of the door icon is touched, the vehicle receives the door lock command from the portable terminal 30 through the center server 10. Accordingly, it is possible to remotely lock the vehicle door.

In a case where the hazard icon in FIG. 13 is in an "ON" state (light-on state) based on the vehicle state information, when a region marked "OFF" of the hazard icon is touched, the vehicle receives a hazard-off command from the portable terminal 30 through the center server 10. Accordingly, it is possible to remotely turn off the hazard lamp.

As shown in FIG. 13, when the door lock command or the like for requesting transmission of the vehicle state information is transmitted, the transmission request signal for the imaging data described above is not transmitted. Therefore, a communication amount when data is uploaded from the vehicle to the center server 10 is smaller than a case where the imaging data of a still image or a moving image is transmitted. The same applies to a communication amount when data is downloaded to the portable terminal 30.

As described above, the center server 10 which is the information processing apparatus according to the embodiment is an information processing apparatus capable of performing communication between a vehicle including an imaging apparatus and a user terminal of a vehicle user. The center server 10 includes a data transmission request unit that requests the vehicle to transmit imaging data captured by the imaging apparatus when a predetermined request signal is received from the user terminal, and a data transmission unit that transmits the imaging data received from the vehicle in response to the request to the user terminal.

With the above configuration, solely when the center server 10 receives a predetermined request signal indicating a transmission request for the imaging data, imaging data inside and outside the vehicle is uploaded to the center server 10, and the imaging data inside and outside the vehicle is downloaded to the portable terminal 30. Therefore, for example, when the user desires to check a vehicle state (door lock state, hazard lamp state, or the like) instead of states inside and outside the vehicle, it is possible to suppress that the imaging data having a large data capacity is uploaded to the center server 10 since the center server 10 does not receive the predetermined request signal.

For this reason, it is possible for the user to check specific vehicle information such as the door lock state and the like while an increase in the communication amount, which is requested for uploading data (imaging data) for reproducing images inside and outside the vehicle to the portable terminal 30, between the in-vehicle device 200 and the center server 10 is suppressed. In addition, it is possible to effectively utilize communication resources by suppressing the increase in the communication amount between the in-vehicle device 200 and the center server 10.

In addition, it is possible to suppress an increase in a communication amount requested for downloading to the portable terminal 30 from a cellular phone base station or the like communicating with the portable terminal 30. Accordingly, it is possible to suppress an increase in a packet use amount in the portable terminal 30 and to effectively utilize the communication resources.

An information processing program according to the embodiment causes a computer to execute a step of requesting transmission of imaging data captured by an imaging apparatus when a predetermined request signal is received from a user terminal of a user of a vehicle including the imaging apparatus, and a step of transmitting the imaging data received from the vehicle in response to the request to the user terminal. Accordingly, it is possible to suppress uploading of imaging data having a large data capacity to the center server 10 without additional significant improvement of the existing center server 10.

The configuration described in the above embodiment shows an example of the contents of the disclosure and can be combined with another known technique. It is also possible to omit or change a part of the configuration within a scope not departing from the gist of the disclosure.

What is claimed is:

1. An information processing system comprising:
an information processing apparatus communicable with a vehicle, the vehicle including an imaging apparatus and a user terminal of a user of the vehicle, and the information processing apparatus comprising a first processor configured to:
request the vehicle to transmit imaging data captured by the imaging apparatus when a predetermined request signal is received from the user terminal; and
in response to the request signal, transmit to the user terminal the imaging data received from the vehicle; and
a second processor, which is provided in the vehicle and is configured to:
shut down current supply from an auxiliary battery to the imaging apparatus from when ignition off of the vehicle is detected until the request signal is received; and
when the request signal is received after the ignition off has been detected, restart current supply from the auxiliary battery to the imaging apparatus.

2. The information processing system according to claim 1, wherein the second processor is further configured to:
stop an operation of the imaging apparatus when a charging state of an auxiliary battery that supplies a current to the imaging apparatus becomes less than a predetermined threshold value from when ignition off of the vehicle is detected until the request signal is received.

3. A non-transitory computer-readable medium storing an information processing program for causing a computer to execute the steps of:
requesting transmission of imaging data captured by an imaging apparatus when a predetermined request signal is received from a user terminal of a user of a vehicle including the imaging apparatus;

in response to the request signal, transmitting to the user terminal the imaging data received from the vehicle;

shutting down current supply from an auxiliary battery to the imaging apparatus from when ignition off of the vehicle is detected until the request signal is received; and when the request signal is received after the ignition off has been detected, restarting current supply from the auxiliary battery to the imaging apparatus.

\* \* \* \* \*